UNITED STATES PATENT OFFICE.

JAMES M. CALLER, OF SALEM, MASSACHUSETTS.

IMPROVED METHOD OF TREATING TAN-BARK.

Specification forming part of Letters Patent No. 48,365, dated June 27, 1865.

*To all whom it may concern:*

Be it known that I, JAMES M. CALLER, of Salem, in the county of Essex and State of Massachusetts, have invented a new and useful Improvement in Treating Tan-Barks; and I do hereby declare that the following is a full, clear, and exact description thereof, which will enable others skilled in the art to fully understand and make use of the same.

The object of this improvement is to assist the tanning of skins of all kinds by facilitating the production of tanning compounds from the various barks commonly employed for tanning purposes.

Having removed all the dead bark, which is of no value for tanning, I next grind the bark into a coarse powder in the usual manner. I then place the pulverized bark in a tall displacement apparatus of sufficient capacity, into which I inject steam, causing it to ferment the whole mass until the bark becomes properly swelled and its cells expanded. I then flow the mass with boiling-hot water, and after allowing it to stand long enough to dissolve the tannin I allow the tannin slowly to filter out from the bottom of the displacement apparatus through a suitable opening. I then again treat the bark remaining in the displacement apparatus with hot water, repeating the treatment until all the tannin is extracted from the bark. The tannin-liquor thus obtained I then pass into vacuum-pans of the ordinary construction, and evaporate the water until a solid extract of sufficient density is obtained, when I remove the mass through an opening in the bottom of the vacuum-pan. The tannin product thus obtained is then ready for use. To prepare tanning-liquids for tanning purposes I dissolve suitable quantities of the solid product described in water.

By this process I avoid the oxidation of the tannin and prevent its decomposition and conversion into humic and other organic acids having no tanning properties, so that the solid extract thus obtained is far more valuable for tanning purposes than that obtained by evaporation in the open air.

I am aware that steam has before been employed in treating tan-bark, as described and claimed by S. W. Pingree in his patent of March 1, 1864. This, therefore, I do not claim.

Having thus described my invention, I claim as new and desire to secure by Letters Patent—

The process hereinbefore described of producing a solid extract from tan-bark by steaming, leaching, and subsequent evaporation *in vacuo.*

JAS. M. CALLER.

Witnesses:
M. M. LIVINGSTON,
C. L. TOPLIFF.